United States Patent
Okita et al.

(10) Patent No.: US 8,098,038 B2
(45) Date of Patent: Jan. 17, 2012

(54) SERVOMOTOR CONTROL SYSTEM ENABLING HIGH-SPEED OSCILLATING MOTION TO BE HIGHLY PRECISE

(75) Inventors: Tadashi Okita, Minamitsuru-gun (JP); Yukio Toyozawa, Minamitsuru-gun (JP); Naoto Sonoda, Minamitsuru-gun (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 0 days.

(21) Appl. No.: 12/878,389

(22) Filed: Sep. 9, 2010

(65) Prior Publication Data

US 2011/0133681 A1 Jun. 9, 2011

(30) Foreign Application Priority Data

Dec. 9, 2009 (JP) ................................. 2009-279760

(51) Int. Cl.
*G05B 11/01* (2006.01)
(52) U.S. Cl. ............... 318/560; 318/567; 318/568.13; 318/39; 318/573; 700/13; 700/27; 700/35
(58) Field of Classification Search .................. 318/560, 318/568.1, 568.13, 567, 569, 632, 635, 573; 700/13, 27, 35
See application file for complete search history.

(56) References Cited

U.S. PATENT DOCUMENTS

| | | | |
|---|---|---|---|
| 5,019,763 A | 5/1991 | Komatsu | |
| 5,172,040 A | 12/1992 | Sasaki et al. | |
| 5,371,451 A * | 12/1994 | Toyosawa et al. | 318/568.13 |
| 6,686,716 B1 * | 2/2004 | Predina et al. | 318/560 |
| 6,859,007 B2 * | 2/2005 | Toyozawa et al. | 318/632 |
| 6,903,527 B2 * | 6/2005 | Toyozawa et al. | 318/568.13 |
| 7,479,750 B2 | 1/2009 | Iwashita et al. | |
| 7,590,458 B2 * | 9/2009 | Endo et al. | 700/47 |

FOREIGN PATENT DOCUMENTS

| | | |
|---|---|---|
| JP | 2-39304 | 2/1990 |
| JP | 3-31906 | 2/1991 |
| JP | 3-175502 | 7/1991 |
| JP | 4-289903 | 10/1992 |
| JP | 2004-280772 | 10/2004 |
| JP | 2007-206857 A | 8/2007 |

OTHER PUBLICATIONS

Notice of Grounds for Rejection (Office Action) (and its English translation) from corresponding Japanese Patent Application 2009-279760 dated Feb. 1, 2011, 4 pages.

* cited by examiner

*Primary Examiner* — Rita Leykin
(74) *Attorney, Agent, or Firm* — Drinker Biddle & Reath LLP (57) ABSTRACT

A servomotor control system that includes a numerical control unit and servo control unit enables the use of learning control based on an angle synchronization method in high-speed oscillating motion performed by, for example, a jig grinder. The numerical control unit calculates a reference angle $\theta(=\omega t)$, and also calculates a cyclic oscillation command $F(t)$ according to the reference angle $\theta$ and a machining condition (angular velocity $\omega$). The servo control unit calculates a difference between the value in the oscillation command $F(t)$ and the position of the servomotor (positional difference $\epsilon$) at intervals of a predetermined cycle, and performs learning control according to the reference angle $\theta$, oscillation command $F(t)$, and positional difference $\epsilon$.

6 Claims, 13 Drawing Sheets

SERVOMOTOR CONTROL SYSTEM ENABLING HIGH-SPEED OSCILLATING MOTION TO BE HIGHLY PRECISE

RELATED APPLICATION DATA

This application claims priority under 35 U.S.C. §119 and/or §365 to Japanese Application No. 2009-279760 filed Dec. 9, 2009, the entire contents of which are incorporated herein by reference.

BACKGROUND OF THE INVENTION

1. Field of the Invention

The present invention relates to a servomotor control system and, more particularly, to a servomotor control system that enables high-speed oscillating motion to be highly precise.

2. Description of the Related Art

As for jig grinders and the like, there is a need for a control system that enables highly precise machining during high-speed oscillating motion of a grinding stone. Particularly, highly precise upper dead centers and lower dead centers in vertical oscillating operations are required.

Figure 13:
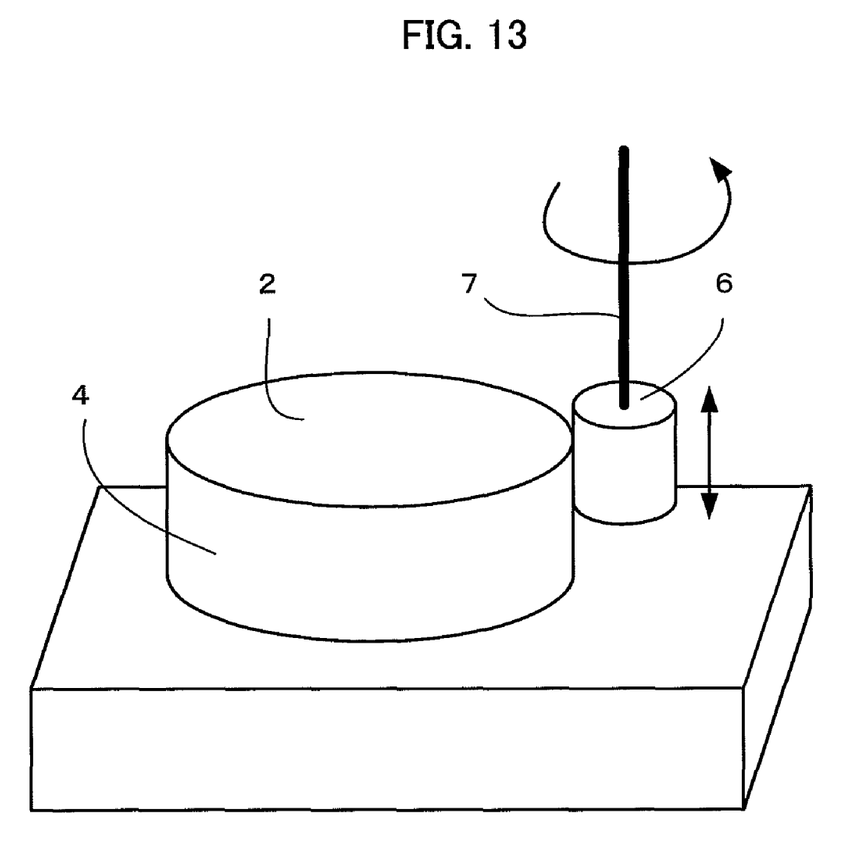
FIG. 13 shows a jig grinder.

A jig grinder is a machine tool that carries out finish grinding for sides of jigs, trimming dies, gages, and other tools for machines and for internal surfaces of holes. As shown in FIG. 13, a jig grinder grinds the side 4 of a workpiece 2 placed on a table (not shown) with the outer circumference of a cylindrical grinding stone 6; the cylindrical grinding stone 6 rotates on its axis, that is, a rotation axis 7 while being vertically oscillated in the axial direction of the rotation axis 7.

With a conventional control system used for a jig grinder, precision is increased by correcting commands to suppress tracking delays in servo control. Specifically, to increase the precision of the upper dead center and lower dead center, an oscillation command is compared with the operation of the servo, and a commanded amplitude is gradually increased (see Japanese Patent Application Laid-Open No. 4-289903 and Japanese Patent Application Laid-Open No. 3-31906).

In this method, however, a long tracking time is taken to obtain desired precision. There is another problem with stability; a divergence may occur due to a change in a machining condition such as a change in amplitude.

A known method that achieves highly precise tracking at high speed in response to a repetition command is learning control (repetitive control). Two types of learning control are used; a time synchronization method in which learning is performed with respect to time (see Japanese Patent Application Laid-Open No. 3-175502) and an angle synchronization method in which learning is performed with respect to angle (see Japanese Patent Application Laid-Open No. 2004-280772).

In the learning control based on the time synchronization method, described above, a delay memory the length of which is equal to the length of a commanded repetitive cycle is provided in a control unit, so this type of leaning control cannot be used when the commanded repetitive cycle dynamically changes. In the learning control based on the angle synchronization method, described above, a reference angle that monotonously increases in synchronization with a commanded repetitive operation is needed, so this type of learning control cannot be used when no reference angle is given.

In high-speed oscillating motion performed by, for example, a jig grinder, a commanded repetitive cycle dynamically changes according to the machining condition. There is no reference angle that should be in synchronization with a commanded repetitive operation, making it impossible to use a reference angle in servo control. Accordingly, neither the learning control based on the time synchronization method nor the learning control based on the angle synchronization method can be used.

SUMMARY OF THE INVENTION

An object of the present invention is to provide a servomotor control system that enables the use of learning control based on an angle synchronization method in high-speed oscillating motion performed by, for example, a jig grinder.

The novel servomotor control system to achieve the above object controls a servomotor, provided in a machine tool or an industrial machine, that drives a driven body cyclically oscillating at high speed; the servomotor control system includes a control unit and a servo control unit. The control unit includes a reference angle calculating means for calculating a reference angle and an oscillation command calculating means for calculating a cyclic oscillation command according to the reference angle and a machining condition. The servo control unit includes a position detecting means for detecting the position of the servomotor, a positional difference calculating means for calculating, for each commanded distribution cycle, a positional difference between a position in the oscillation command and the detected position of the servomotor, and a learning control means for performing learning control on the basis of the reference angle, the oscillation command, and the positional difference. The positional difference calculated by the positional difference calculating means is corrected by the learning control means, and the corrected positional difference is used to control the driving of the servomotor.

The reference angle calculating means may calculate the reference angle $\omega t$ at time "t" ($=nT$, where n is 1, 2, 3, ...) from an angular velocity $\omega$ given according to the machining condition and the commanded distribution cycle T.

The learning control means may include first converting means for converting the positional difference obtained in the each commanded distribution cycle to a difference for each reference angle, correction calculating means for calculating the amount of correction with respect to the reference angle from the converted difference for each reference angle, correction storage means for storing the calculated amount of correction for at least one cycle of the driven body, which cyclically oscillates at high speed, second converting means for converting the amount of correction stored in the correction storage means to an amount of correction for each commanded distribution cycle, and a phase advancing filter for advancing a phase for the amount of correction obtained by the second converting means.

The servo control unit may further include means for calculating, from the oscillation command and the position of the servomotor, the amount of overshoot at the start of an oscillation and means for adjusting the output of the phase advancing filter according to the amount of overshoot.

The servo control unit may further include means for calculating, from the oscillation command and the position of the servomotor, an amount of overshoot when an oscillation speed changes and means for adjusting the size of the amount of correction stored in the correction storage means according to the amount of overshoot.

The servo control unit may further include means for detecting that the positional difference falls within a prescribed range near 0 at the start of the oscillation. After the positional difference falls within the prescribed range near 0, the first converting means can start conversion of the positional difference obtained in the each commanded distribution cycle to the difference for each reference angle.

The servo control unit may further include means for obtaining velocity data about the servomotor from the positional data about the servomotor at the end of the oscillation and means for adjusting the output of the phase advancing filter by using the velocity data about the servomotor.

The present invention can provide a servomotor control system having the above structure to enable the use of learning control based on an angle synchronization method in high-speed oscillating motion performed by, for example, a jig grinder.

BRIEF DESCRIPTION OF THE DRAWINGS

The purposes and advantages of the present invention, including those described above, will be clarified by referring to the attached drawings in combination with the description of the embodiments described below. Of these drawings.

DETAILED DESCRIPTION OF THE PREFERRED EMBODIMENTS

Figure 1:
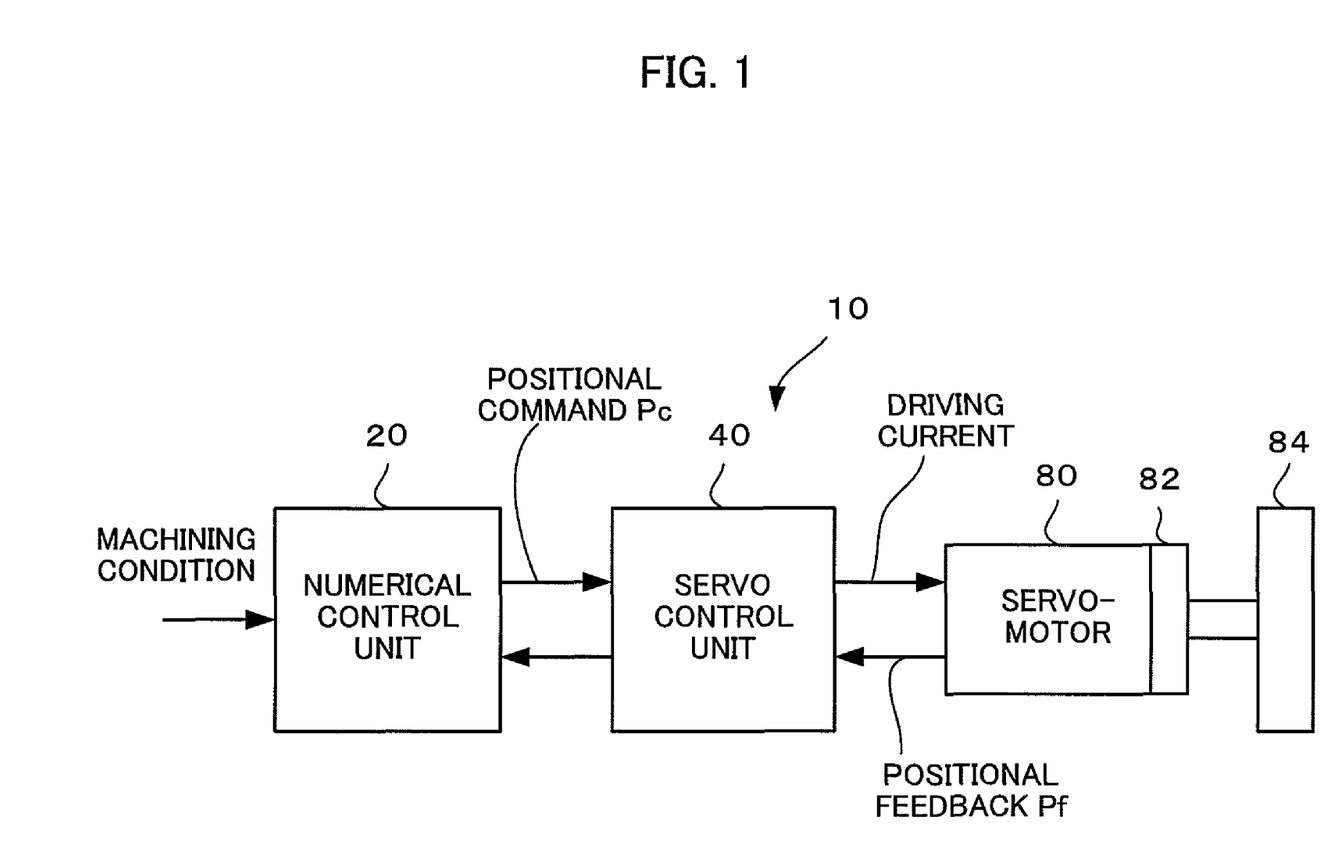
FIG. 1 is a block diagram illustrating a servomotor control system according to the present invention.

FIG. 1 is a block diagram illustrating a servomotor control system according to the present invention. The servomotor control system 10 includes a numerical control unit 20, a servo control unit 40, and a servomotor 80; the servomotor control system 10 controls a machine tool or an industrial machine.

The numerical control unit 20 calculates a positional command Pc and outputs it to the servo control unit 40. The servomotor 80 has a position detector 82 for detecting the rotational position of the motor. Positional information detected by the position detector 82 is fed back to the servo control unit 40 as positional feedback Pf. The servo control unit 40 controls the driving of the servomotor 80 according to the positional command Pc and positional feedback Pf. The servomotor control system 10 has a means that enables the use of learning control based on an angle synchronization method in high-speed oscillation motion performed by, for example, a jig grinder, as described later.

Figure 2:
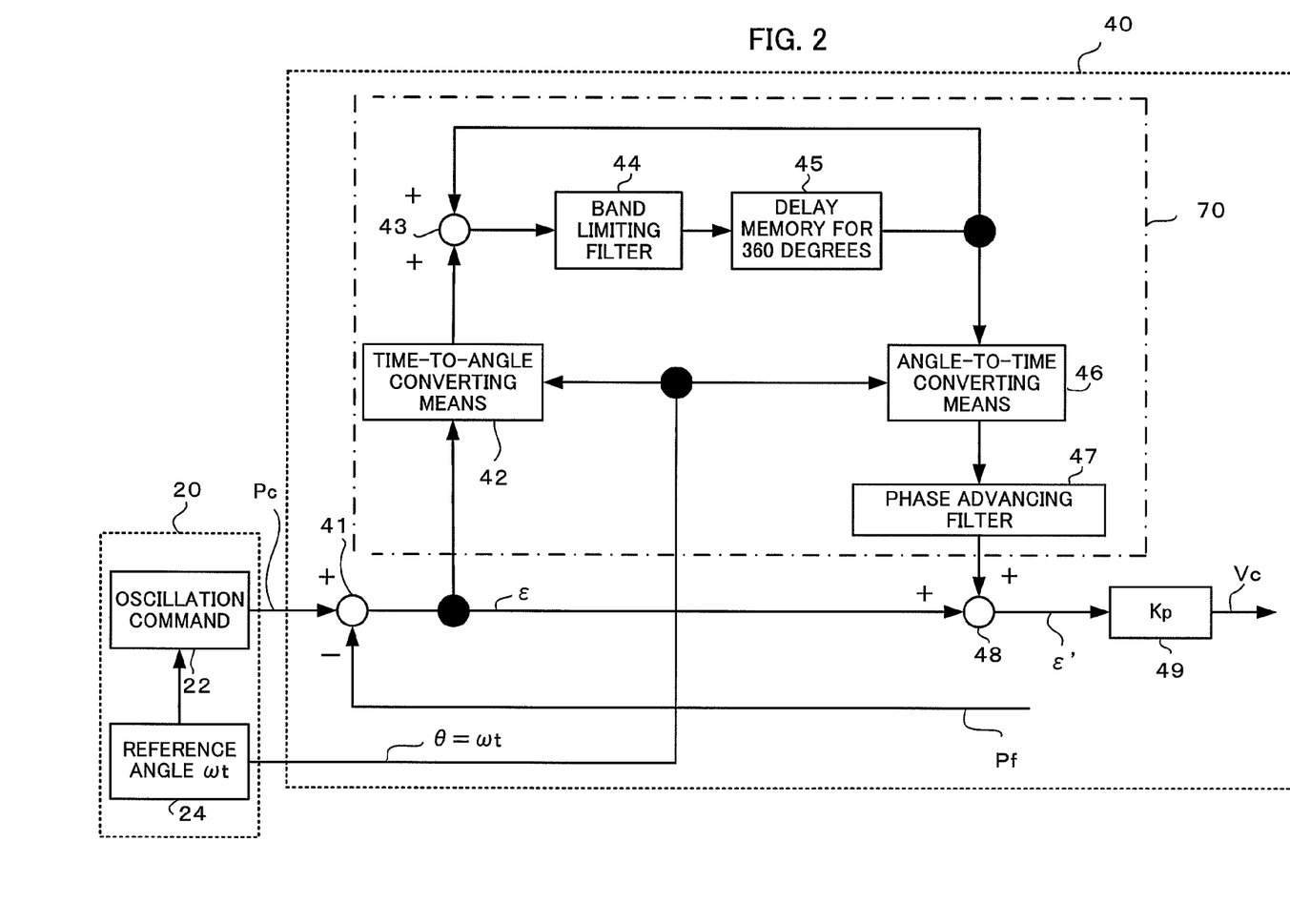
FIG. 2 is a block diagram illustrating a first embodiment of the servomotor control system according to the present invention.

A first embodiment of the servomotor control system according to the present invention will be described first with reference to FIG. 2. FIG. 2 illustrates a method of applying the learning control based on the angle synchronization method to a repetitive command.

The numerical control unit 20 calculates an oscillation command F(t) in an oscillation command calculating means 22, according to shaping conditions. An exemplary oscillation command is $F(t) = A \cdot \cos(\omega t)$ (coefficient A is an amplitude). The numerical control unit 20 distributes the positional command Pc to the servo control unit 40 at intervals of a commanded distribution cycle T, according to the oscillation command F(t). The numerical control unit 20 also calculates, in a reference angle calculating means 24, a reference angle $\theta (=\omega t)$ in each commanded distribution cycle from time t ($=nT$, n is 1, 2, 3, . . . ) and an angular velocity $\omega$, which is a machining condition. The oscillation command F(t) is calculated from reference angle $\theta (=\omega t)$.

The servo control unit 40 according to the present invention has a function for performing leaning control according to the positional command Pc, the positional feedback Pf, which indicates the current position of the servomotor, and the reference angel $\theta (=\omega t)$, which is an angle to be referenced. In the case of the sine wave, the angular velocity $\omega$ can also be obtained from a tangential velocity and the amplitude, as the machining condition. The oscillation command F(t) may command a triangular wave instead of the sine wave.

A calculator 41 subtracts the positional feedback Pf, which is sent from the position detector 82 attached to the servomotor 80 to detect the position of the servomotor 80, from the position command Pc output from the numerical control unit 20, and obtains a positional difference $\epsilon$. A calculator 48 adds the amount of correction sent from a first learning control unit 70, which will be described later, to the positional difference $\epsilon$ to correct the positional difference $\epsilon$. The corrected positional difference $\epsilon'$ is multiplied by a position gain Kp (49) to obtain a velocity command Vc. That is, positional loop control processing is carried out.

A velocity control unit (not shown) performs velocity loop control processing on the obtained velocity command Vc to obtain a current command. A current control unit performs current loop control processing according to the obtained current command and current feedback sent from a current detector (not shown) and controls the driving of the servomotor 80 through a current amplifier (not shown).

The structure and effect described above are the same as for conventional servo control units except that the calculator 48 adds the amount of correction sent from the first learning control unit 70 to the positional difference.

The numerical control unit 20 sends the reference angle $\theta (=\omega t)$, which is a reference used in repetitive positional command Pc calculation, to the servo control unit 40 together with the positional command Pc, so the servo control unit 40 can control angle synchronization with reference to the reference angle $\theta (=\omega t)$.

Next, the first learning control unit 70, which controls learning in the angle synchronization method, will be described. The first learning control unit 70 includes a time-to-angle converting means 42, an adder 43, a band limiting filter 44, a delay memory 45, an angle-to-time converting means 46, and a phase advancing filter 47.

The time-to-angle converting means 42 is the first converting means that converts the positional difference $\epsilon$ in each commanded distribution cycle to the positional difference $\epsilon$ through each prescribed angle by using the positional difference $\epsilon$ and reference angle $\theta(=\omega t)$. Specifically, the first converting means converts the time-based positional difference $\epsilon$ to the angle-based positional difference $\epsilon$. The adder 43 adds the positional difference $\epsilon$ at a prescribed angle $\theta'(m)$ ($m=1, 2, 3, \ldots, m_{max}$), obtained by the first converting means (time-to-angle converting means 42), to correction data at the prescribed angle $\theta'(m)$ in a corresponding one pattern cycle before, stored in the delay memory 45.

The band limiting filter 44 filters the output from the adder 43 to obtain correction data, and outputs the obtained correction data (correction data at a prescribed angle) to the delay memory 45 in which data corresponding to the reference angles for 360 degrees is stored. The delay memory 45 stores correction data received from the band limiting filter 44.

The angle-to-time converting means 46 is the second converting means, which reads correction data corresponding to the reference angle $\theta(=\omega t)$ from the delay memory 45 according to the prescribed angle $\theta'(m)$, and converts the read correction data (angle-based correction data) to time-based correction data. The time-based correction data converted by the second converting means (angle-to-time converting means 46) is compensated for a phase delay, which is a parameter to be controlled, by the phase advancing filter 47, and the compensated data is output to the calculator 48. The calculator 48 adds the positional difference $\epsilon$ to the amount of correction sent from the first learning control unit 70.

The first converting means (time-to-angle converting means 42) and second converting means (angle-to-time converting means 46) will be described below in detail.

The first converting means (time-to-angle converting means 42) converts the positional difference $\epsilon$ obtained for each commanded distribution cycle (for each position and velocity loop processing cycle) to the positional difference at the reference angle $\theta'(m)$. The delay memory 45 has memory sections, each of which stores the correction data at the angular position $\theta'(m)$, which is the prescribed angle obtained by dividing one pattern cycle in which a repetitive operation for, for example, a repeatedly commanded machining shape is performed. If the one pattern cycle is $2\pi$ and it is divided at intervals of "d", the delay memory 45 has at least $(2\pi/d)$ memory sections. For example, if $(2\pi/d)$ is taken as "q", the delay memory 45 has memory sections that store correction data at angular positions $\theta'(m)$ from $\theta'(0)$ ($=0$) to $\theta'(q-1)$ ($=2\pi-d$) in one pattern.

The second converting means (angle-to-time converting means 46) obtains correction data $\delta(n)$ at the time of the current sampling by interpolating correction data at reference angles $\theta'(m)$ and $\theta'(m+1)$ before and after the reference angle $\theta(n)$, according to the reference angles $\theta(n)$ obtained in each commanded distribution cycle. The obtained correction data $\delta(n)$ is correction data at the time of the current sampling (time-based correction data).

Figure 3:
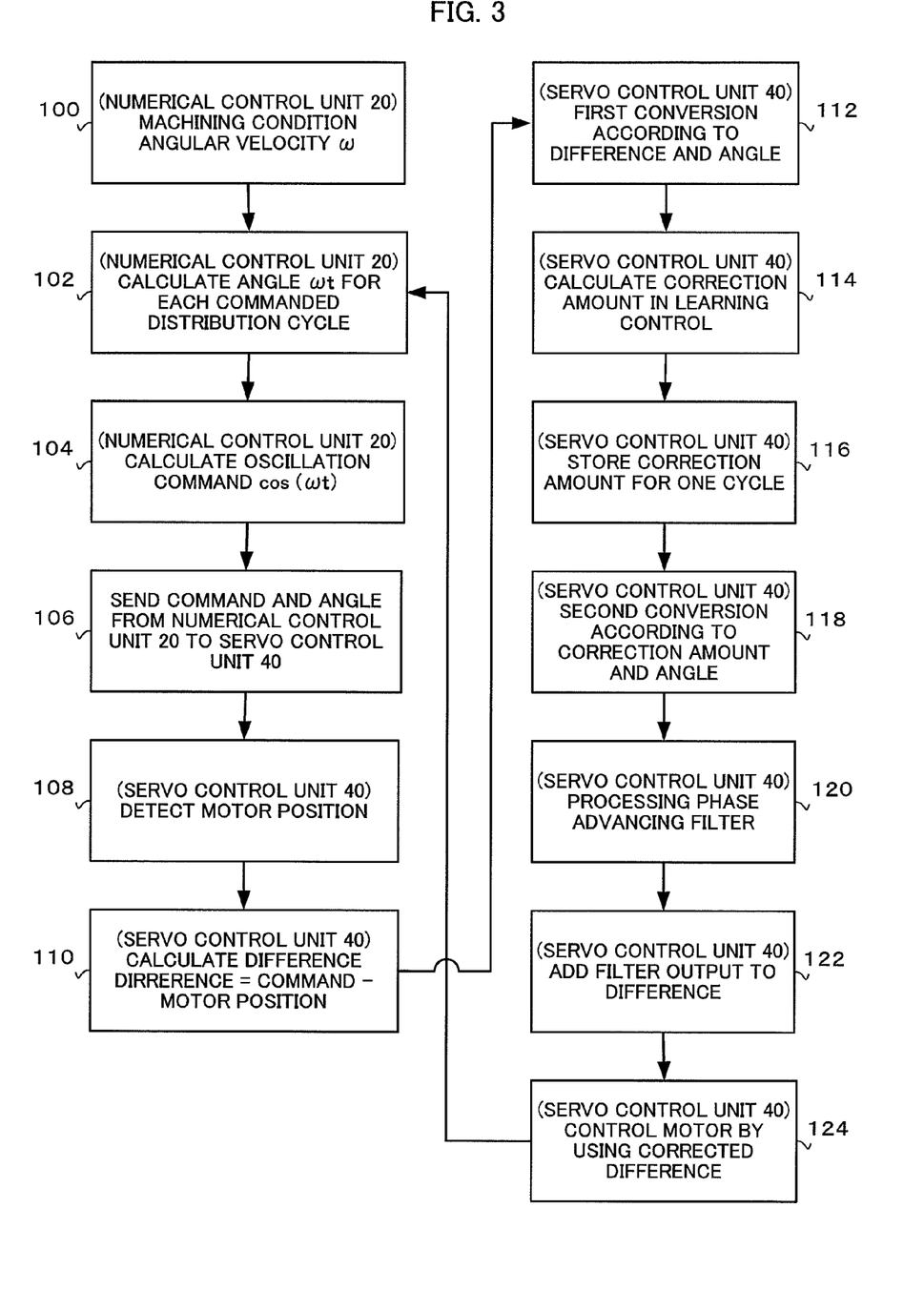
FIG. 3 is a flowchart illustrating learning control processing in an angle synchronization method executed by the servomotor control system in FIG. 2.

FIG. 3 is a flowchart illustrating learning control processing in the angle synchronization method executed by the servomotor control system in FIG. 2. The steps in the flowchart will be described below.

[Step 100] A machining condition is set in the numerical control unit. In this learning control processing, the machining condition is the angular velocity $\omega$.

[Step 102] The numerical control unit calculates the reference angle $\omega t$ for each commanded distribution cycle T; $\omega$ is a angular velocity (machining condition), and "t" is an elapsed time ($t=n \times T$) ($n=1, 2, 3, \ldots$).

[Step 104] The numerical control unit calculates an oscillation command. In this learning control processing, the numerical control calculates $\cos(\omega t)$.

[Step 106] The numerical control unit outputs the positional command Pc and reference angle $\theta$ to the servo control unit.

[Step 108] The servo control unit detects the current position of the servomotor according to the positional feedback Pf from the position detector attached to the servomotor.

[Step 110] The servo control unit calculates a difference (positional difference $\epsilon$) between the positional command Pc and the positional feedback Pf.

[Step 112] The servo control unit carries out first conversion (conversion from the time-based positional difference to the angle-based positional difference) according to the positional difference $\epsilon$ and reference angle $\theta$.

[Step 114] The servo control unit calculates the amount of correction in learning control.

[Step 116] The servo control unit stores the amount of correction for one cycle.

[Step 118] The servo control unit carries out second conversion (conversion from angle-based correction data to time-based correction data) according to the amount of correction and the reference angle $\theta$.

[Step 120] The servo control unit processes the phase advancing filter.

[Step 122] The servo control unit adds the filter output to the positional difference $\epsilon$ to correct the positional difference $\epsilon$.

[Step 124] The servo control unit uses the corrected positional difference $\epsilon'$ to control the servomotor.

Figure 5:
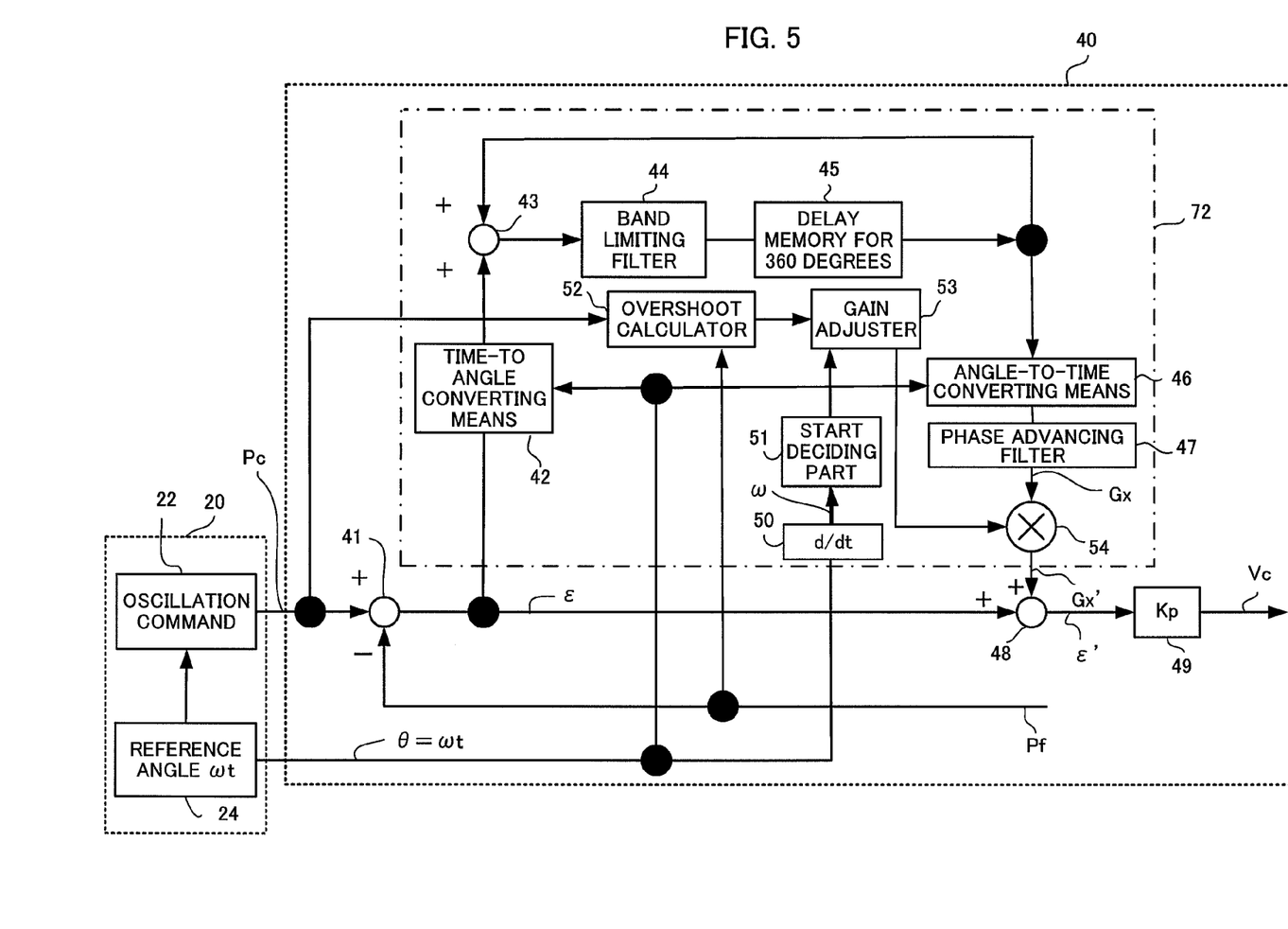
FIG. 5 is a block diagram illustrating a second embodiment of the servomotor control system according to the present invention.

A second embodiment of the servomotor control system according to the present invention will be described next with reference to FIG. 5. FIG. 5 illustrates a countermeasure against an overshoot that is generated when a high-speed oscillation motion starts during the learning control processing in the angle synchronization method.

Figure 4:
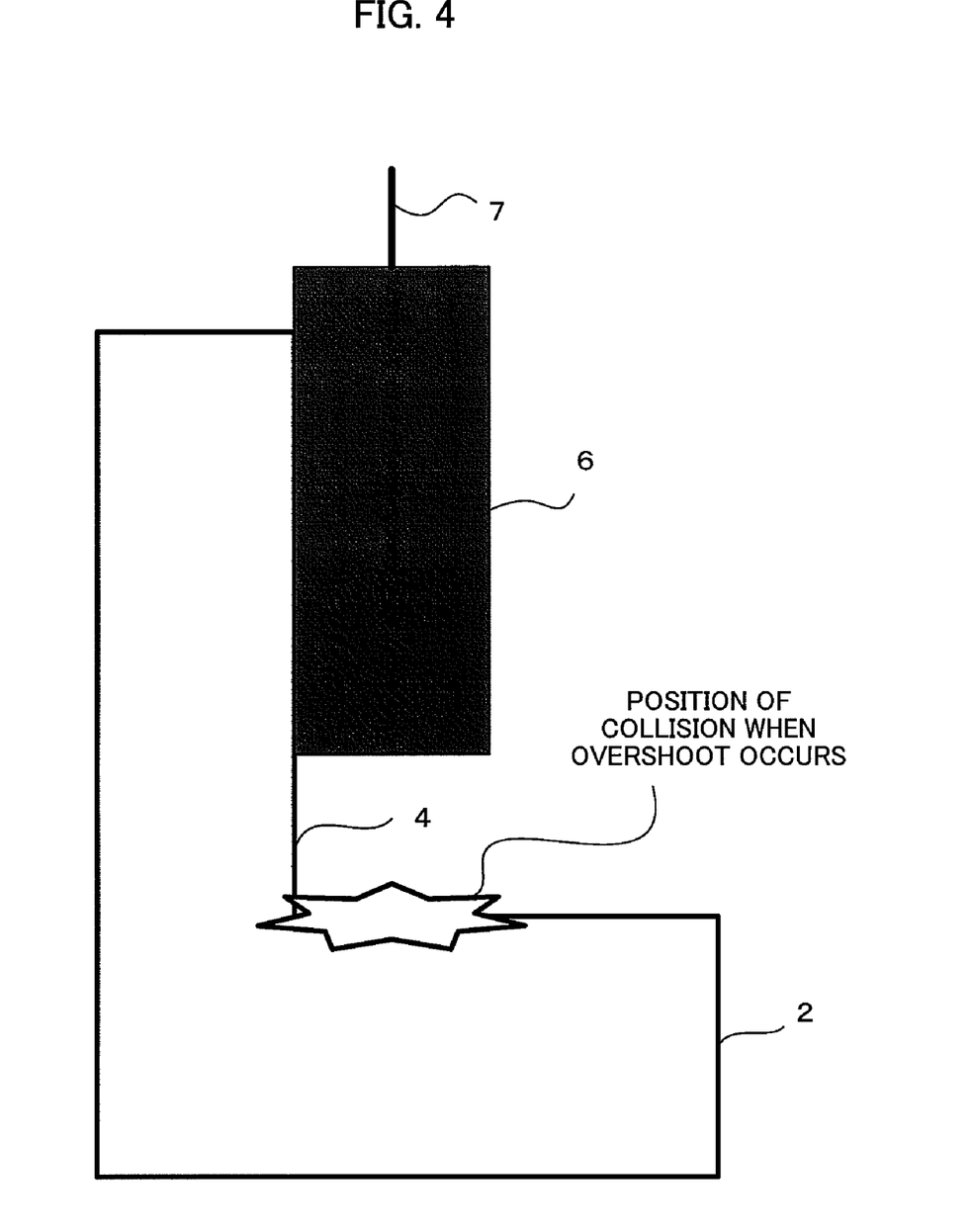
FIG. 4 illustrates that it is important to prevent an overshoot in oscillation motion.

When learning control in the angle synchronization method is applied to high-speed oscillation motion, an overshoot may occur at the start of the oscillation motion. For a jig grinder or the like, if a commanded amplitude is exceeded even a little at the upper or lower dead center of a cylindrical grinding stone 6, the cylindrical grinding stone 6 or another tool may be damaged due to the shape of a workpiece 2 (see FIGS. 4 and 13). FIG. 4 illustrates that it is important to prevent an overshoot in oscillation motion. If an overshoot occurs, an end of the cylindrical grinding stone 6 collides against an end of the workpiece 2, as shown in FIG. 4.

To prevent this type of collision, in the second embodiment of the present invention, there is provided means for determining an optimum learning control parameter before the workpiece 2 is machined and adjusting output Gx from the phase advancing filter 47 in learning control according to the amount of overshoot at the start of oscillation.

A second learning control unit 72 provided in the servomotor control system shown in FIG. 5 is structured by adding, to the first learning control unit 70 included in the servomotor control system shown in FIG. 2a, differentiator 50, a start deciding part 51, an overshoot calculator 52, a gain adjuster 53 and a multiplier 54.

In the second learning control unit 72, when recognizing that the angular velocity $\omega$ obtained by differentiation of the reference angle $\theta$ by the differentiator 50 becomes a non-0, the start deciding part 51 decides that an oscillation motion has started. The overshoot calculator 52 finds the positional command Pc and the maximum value and minimum value of the positional feedback Pf in a period from when the oscillation motion has started until the reference angle θ becomes 360 degrees. If the absolute value of the maximum value or minimum value of the positional feedback Pf is larger than the absolute value of the positional command Pc, the overshoot calculator 52 calculates an overshoot Ov, which is a difference between these absolute values. The gain adjuster 53 calculates a gain adjustment value according to the overshoot Ov. The multiplier 54 multiplies the gain adjustment value by the output Gx from the phase advancing filter 47 to obtain an adjusted output Gx'. Specifically, the output Gx from the phase advancing filter 47 is reduced by calculation in, for example, expression Gx'=(1−α×Ov)×Gx, according to the overshoot Ov. In this case, if Gx is equal to or greater than 0, and Ov is equal to or smaller than 0, then Ov is 0. The symbol α is a constant (see FIGS. 5, 6A, and 6B), which is set in advance as a parameter before machining starts.

It will be described below with reference to FIGS. 6A and 6B that an overshoot (an amount by which the upper dead center and the lower dead center are exceeded) is reduced at the start of oscillation motion according to a sine wave command.

Figure 6A:
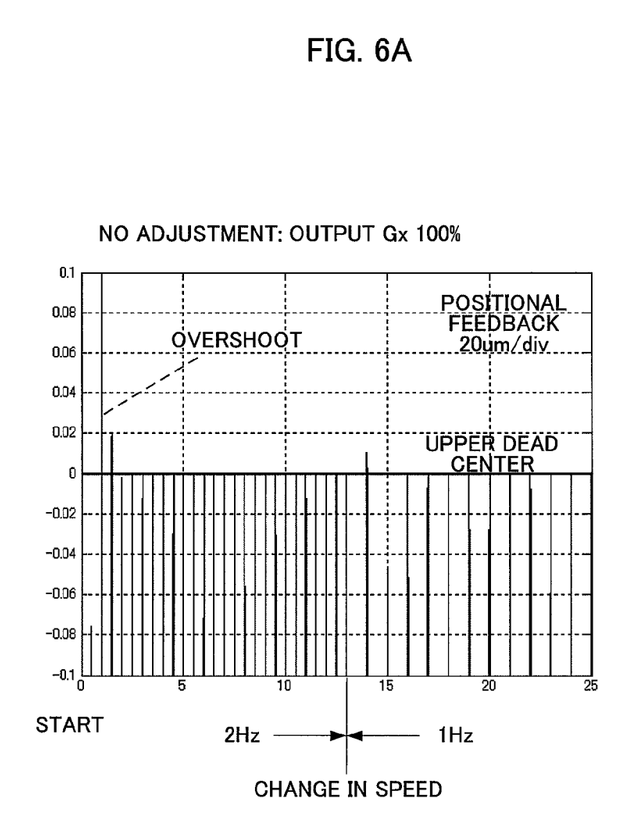
FIGS. 6A and 6B illustrate that an overshoot (an amount by which an upper dead center and a lower dead center are exceeded) is reduced when a sine wave command starts to be executed.
Figure 6B:
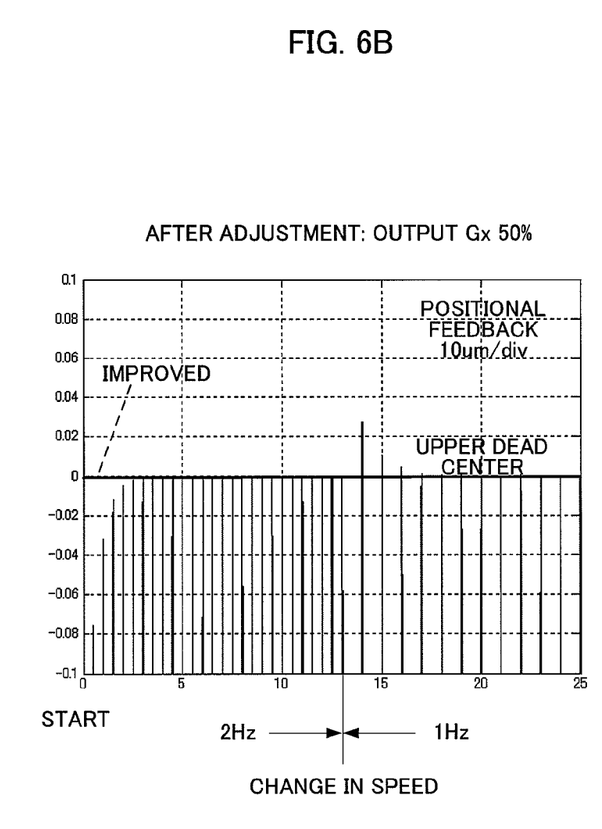

FIG. 6A illustrates a case in which no gain adjustment is performed by the gain adjuster 53 and thereby the output Gx is 100%. FIG. 6B illustrates a case in which gain adjustment is performed by the gain adjuster 53 and thereby the output Gx is reduced to 50% after the adjustment. Although an overshoot (an amount by which the upper dead center and the lower dead center are exceeded) occurs after the oscillation motion starts, as indicated by the graph in FIG. 6A (in which gain is not adjusted), the overshoot at the start of the oscillation motion is reduced by adjusting gain as shown in FIG. 6B.

Incidentally, if the gain of the phase advancing filter 47 is not appropriately set in a tracking process during learning control, an overshoot occurs.

Figure 7:
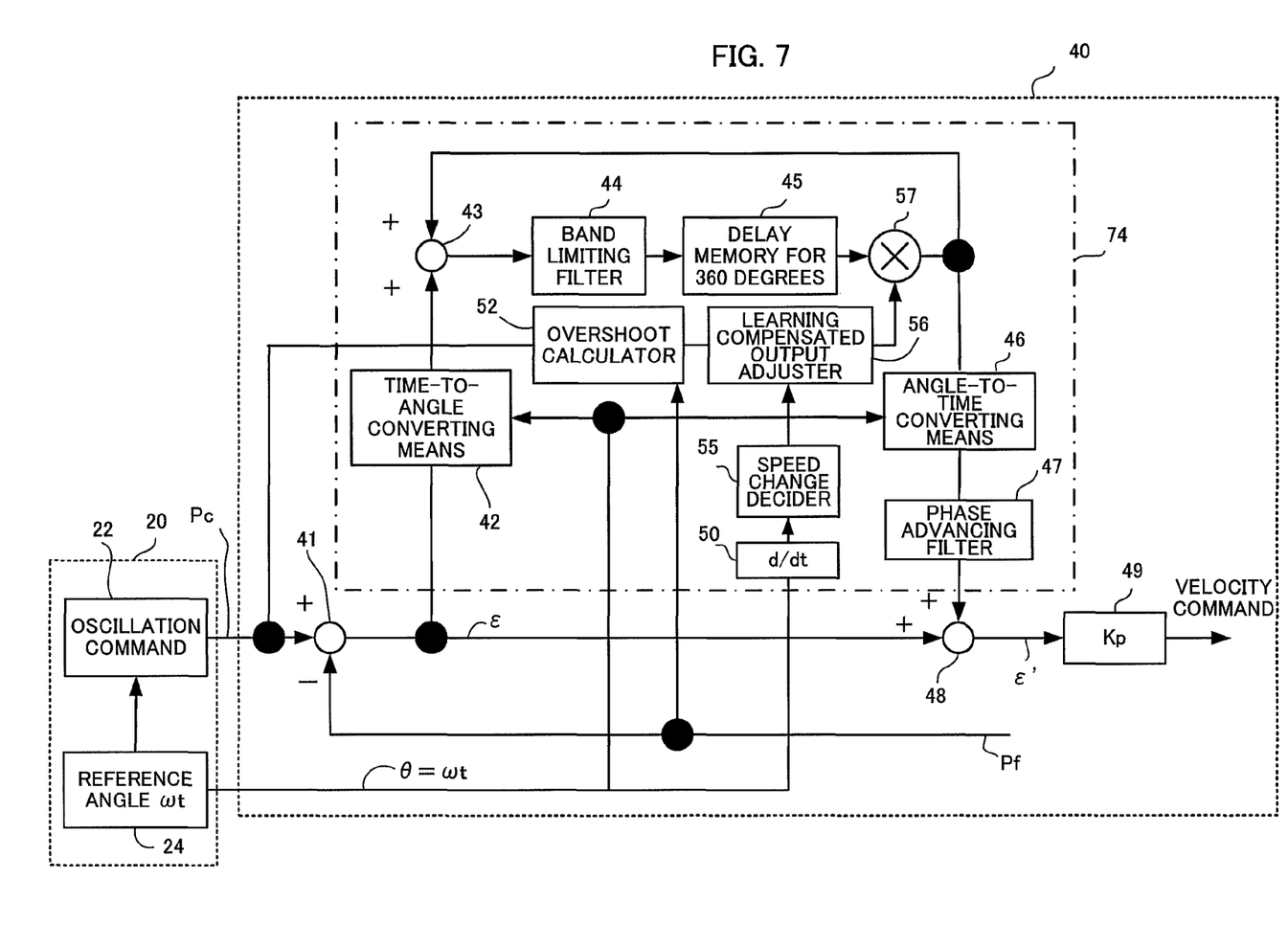
FIG. 7 is a block diagram illustrating a third embodiment of the servomotor control system according to the present invention.

Next, a third embodiment of the servomotor control system according to the present invention will be described with reference to FIG. 7. FIG. 7 illustrates a countermeasure against an overshoot that is generated when the speed of high-speed oscillation motion changes during the learning control processing in the angle synchronization method.

When learning control in the angle synchronization method is applied to high-speed oscillation motion, an overshoot may occur when the speed of the oscillation motion is changed. It is necessary to suppress this overshoot for the same reason as described in the second embodiment (FIG. 5). In particular, when the oscillation motion changes from high speed to low speed, learning control cannot follow the change in speed. The resulting overcompensation may cause on overshoot.

A third learning control unit 74 provided in the servomotor control system shown in FIG. 7 is structured by adding, to the first learning control unit 70 included in the servomotor control system shown in FIG. 2, the differentiator 50, a speed change decider 55, the overshoot calculator 52, a learning compensated output adjuster 56 and a multiplier 57.

To suppress an overshoot caused when the speed of the oscillation motion changes, the speed change decider 55 in the third learning control unit 74 detects a point at which the speed has changed, from the angular velocity ω obtained by differentiation of the reference angle θ by the differentiator 50. That is, when the speed change decider 55 detects a change in the angular velocity ω, it is decided that the speed of the oscillation motion has changed. The overshoot calculator 52 finds the positional command Pc in a period from when the speed of the oscillation motion has changed until the reference angle θ becomes 360 degrees and the maximum value and minimum value of the positional feedback Pf. If the absolute value of the maximum value or minimum value of the positional feedback Pf is larger than the absolute value of the positional command Pc, the overshoot calculator 52 calculates an overshoot Ov, which is a difference between these absolute values. The learning compensated output adjuster 56 calculates a correction value in learning control according to the calculated overshoot Ov. Specifically, output compensation Cm in learning control is reduced by calculation in, for example, expression Cm'=(1−β×Ov)×Cm, according to the overshoot Ov. In this case, if Cm is equal to or greater than 0, and Ov is equal to or smaller than 0, then Ov is 0. The symbol β is a constant (see FIGS. 7 and 8A to 8C), which is set in advance as a parameter before machining starts.

Figure 8A:
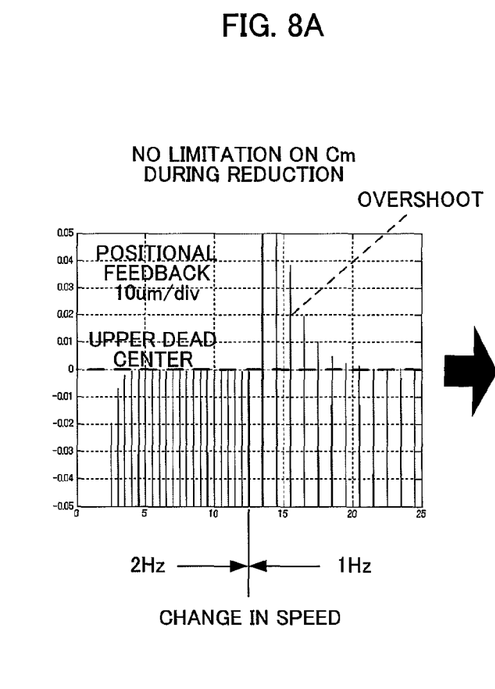
FIGS. 8A to 8C illustrate that an overshoot (an amount by which the upper dead center and the lower dead center are exceeded) is reduced when a commanded frequency in a sine wave command is reduced from 2 Hz to 1 Hz.
Figure 8B:
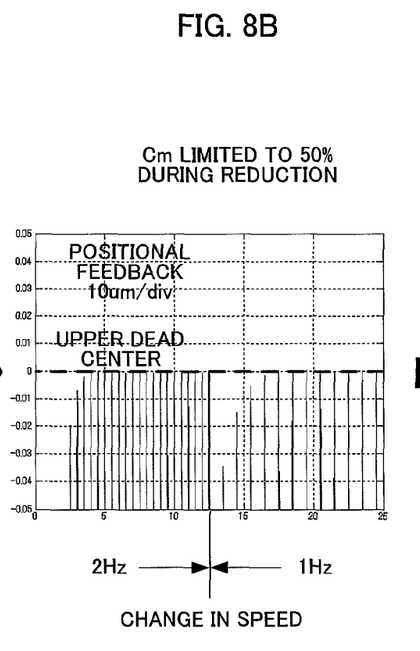
Figure 8C:
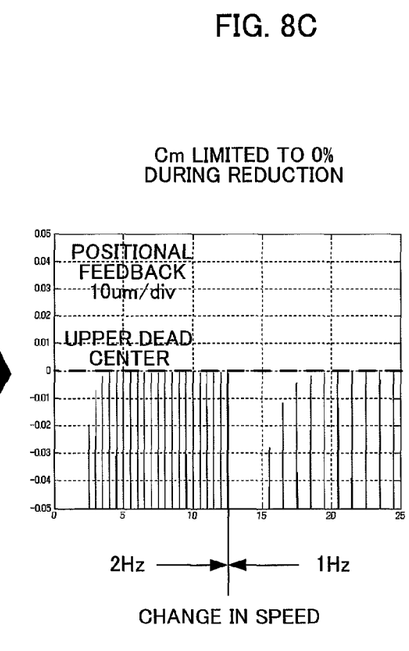

FIGS. 8A to 8C illustrate that an overshoot (an amount by which the upper dead center and the lower dead center are exceeded) is reduced when a commanded frequency in a sine wave command is reduced from 2 Hz to 1 Hz. In FIG. 8A, there is no limitation on the output compensation Cm in learning control when the speed is reduced. In FIG. 8B, the output compensation Cm is limited to 50%. In FIG. 8C, the output compensation Cm is limited to 0%.

When the commanded frequency in a sine wave command is reduced from 2 Hz to 1 Hz, if the output compensation Cm in learning control during the reduction is limited, it is found that the overshoot is reduced as shown in FIGS. 8B and 8C. If the amount of compensation in learning control at 2 Hz is output at 1 Hz, overcompensation occurs, causing an overshoot.

Figure 9:
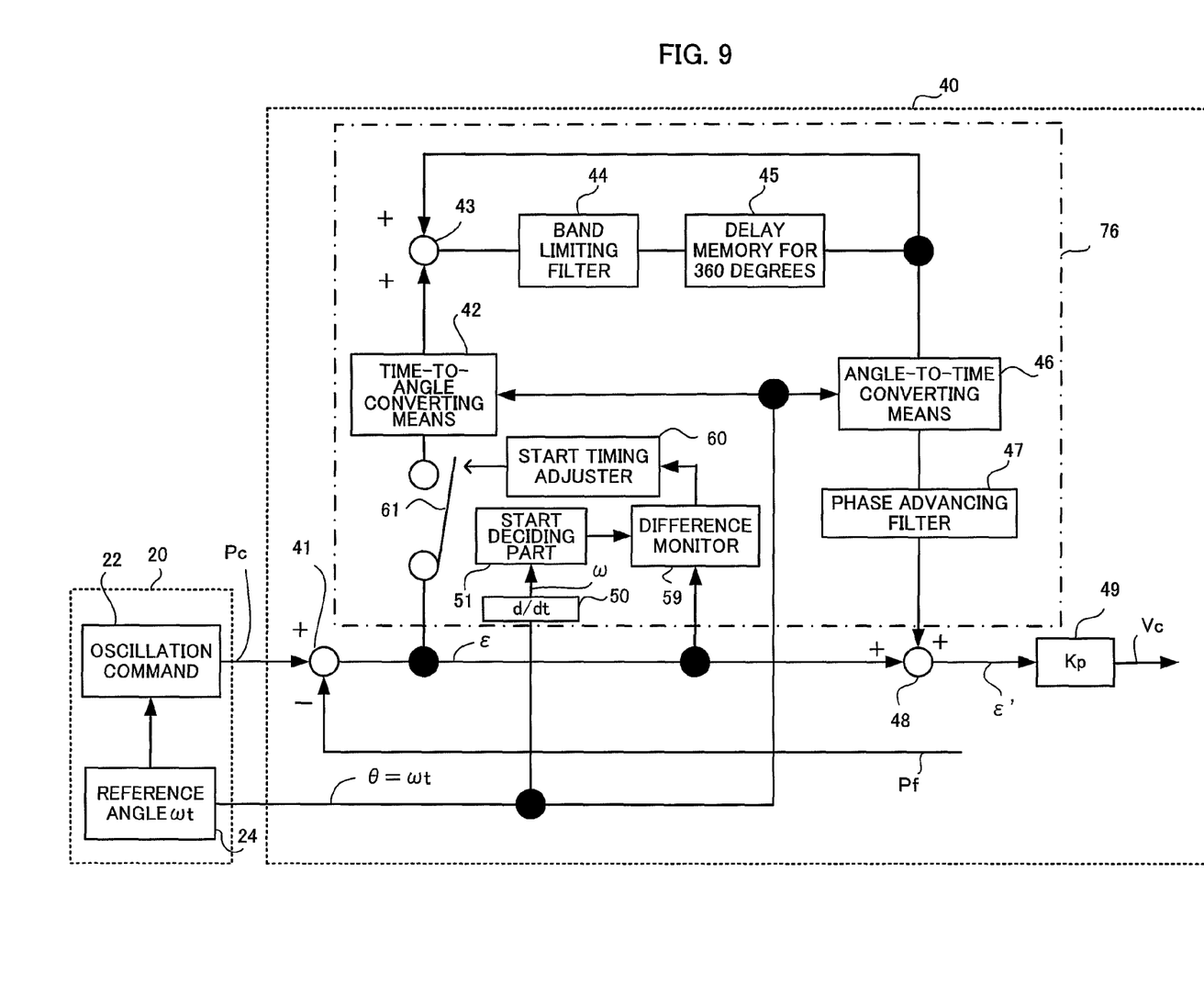
FIG. 9 is a block diagram illustrating a fourth embodiment of the servomotor control system according to the present invention.

Next, a fourth embodiment of the servomotor control system according to the present invention will be described with reference to FIG. 9. FIG. 9 illustrates a countermeasure against a shock that is generated when an oscillation motion starts during the learning control processing in the angle synchronization method.

In learning control, the positional difference rapidly converges to 0, so a large amount of compensation is output according to the degree of the positional difference at the start of learning control. As a result, the servo control unit 40 commands large torque at the start of learning control according to the amount of compensation. This may cause a mechanical shock. A large shock causes mechanical damage, so it should be suppressed.

The servomotor control system shown in FIG. 9 includes means for suppressing a mechanical shock that may be caused when learning control based on the angle synchronization method is applied to high-speed oscillation motion. A fourth learning control unit 76 provided in this servomotor control system is structured by adding, to the first learning control unit 70 included in the servomotor control system shown in FIG. 2, the differentiator 50, the start deciding part 51, a difference monitor 59, a start timing adjuster 60 and a switch 61. The fourth learning control unit 76 monitors the difference at the start of an oscillation motion and delays a time at which to start learning until the difference becomes almost 0.

The differentiator 50 differentiates the reference angle θ and obtains the angular velocity ω. When recognizing that the angular velocity ω calculated by the differentiator 50 becomes a non-0, the start deciding part 51 decides that an oscillation motion has started. Then the difference monitor 59 starts to monitor the value of the difference ε. When the difference monitor 59 recognizes that the value of the difference ε instantaneously falls within a prescribed range near 0, the time-to-angle converting means 42 starts to convert the positional difference ε for each commanded distribution cycle to the positional difference ε through a prescribed angle and then learning control is started.

Figures 10A, 10B, 10C:
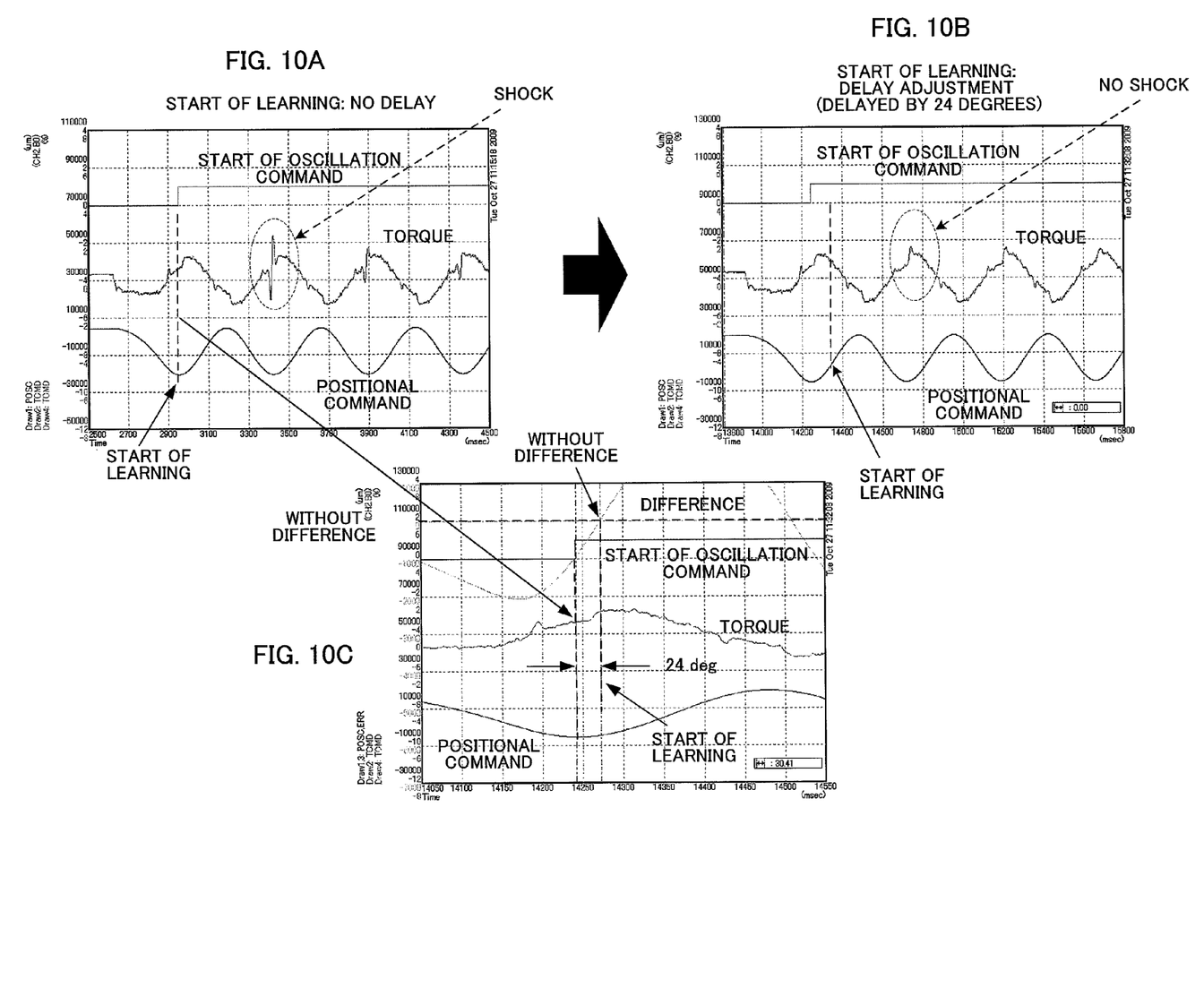
FIGS. 10A to 10C illustrate that a shock is reduced when a sine wave command starts to be executed.

FIGS. 10A to 10C illustrate that a shock is reduced when a sine wave command starts to be executed. As shown in FIG. 10A, when there is no delay in the start of learning, a shock occurs at the start of the sine wave command. As shown in FIG. 10B, however, the delay in the start of the learning is adjusted (learning is delayed by 24 degrees), the shock can be eliminated.

Figure 11:
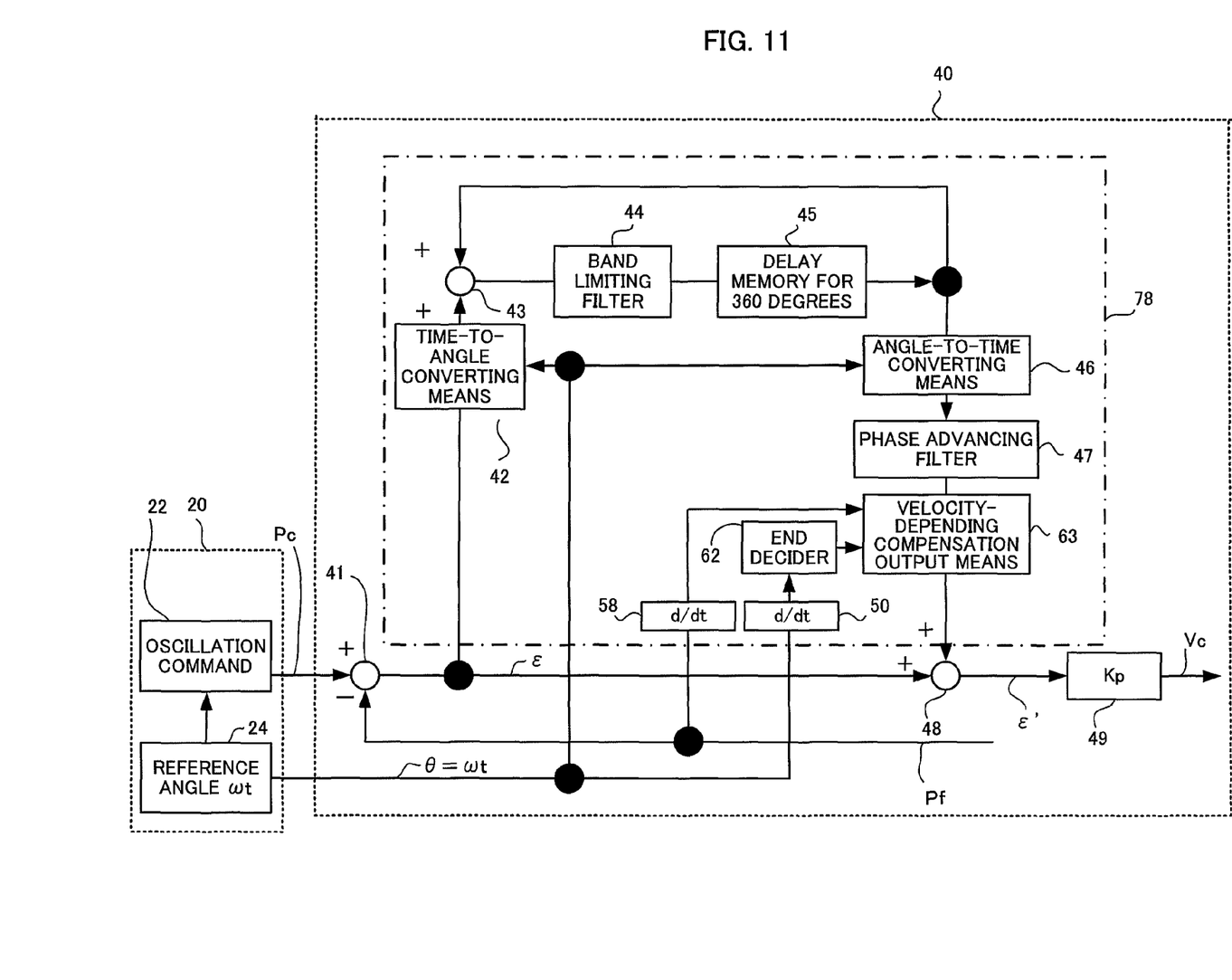
FIG. 11 is a block diagram illustrating a fifth embodiment of the servomotor control system according to the present invention.

Next, a fifth embodiment of the servomotor control system according to the present invention will be described with reference to FIG. 11. FIG. 11 illustrates a countermeasure against a shock that is generated when an oscillation motion ends during the learning control processing in the angle synchronization method.

When learning control in the angle synchronization method is applied to high-speed oscillation motion, there is a problem in that a shock occurs when the oscillation motion stops. The servomotor control system shown in FIG. 11 includes means for suppressing this type of shock caused at the stop of the oscillation motion.

To stop the oscillation motion, the angular velocity can be reduced with a certain time constant without a problem. When the oscillation motion is immediately stopped or when learning control is rapidly stopped to suspend the oscillation motion and perform normal linear reduction in speed, however, the amount of compensation suddenly becomes 0, so the positional difference rapidly increases and a shock occurs. This problem depends on the degree of the speed when the oscillation motion is stopped. A large shock causes mechanical damage, as described above, so it should be suppressed.

To suppress the shock, the servomotor control system shown in FIG. 11 uses the motor velocity at the stop of the oscillation motion and output from the phase advancing filter at that time to reduce the output according to the reduced velocity of the motor. A fifth learning control unit 78 provided in this servomotor control system is structured by adding, to the first learning control unit 70 included in the servomotor control system shown in FIG. 2, the differentiator 50, a differentiator 58, an end decider 62 and a velocity-depending compensation output means 63.

The start and end of the oscillation motion are decided according to the value of the angular velocity ω obtained by differentiation of the reference angle θ(=ωt) by the differentiator 50. At the same time, whether to enable or disable learning control is also decided according to a change in the angular velocity ω. This is because when the angular velocity ω becomes 0, learning control in the angle synchronization method is disabled.

If detected that an angular velocity ω becomes 0, then it is decided that the oscillation motion and learning have been ended, and the output Gx from the phase advancing filter 47 at the time of oscillation motion end is tentatively held without alteration. Then, this output (Gx') is gradually reduced depending on the velocity Ve, by using, for example, expression Gx'=Gx×Ve/Vo. In the above expression, Vo is the motor velocity at the time of oscillation motion end. Ve can be obtained by differentiation of the positional feedback Pf by the differentiator 58 (see FIGS. 11, 12A, and 12B).

Figure 12A:
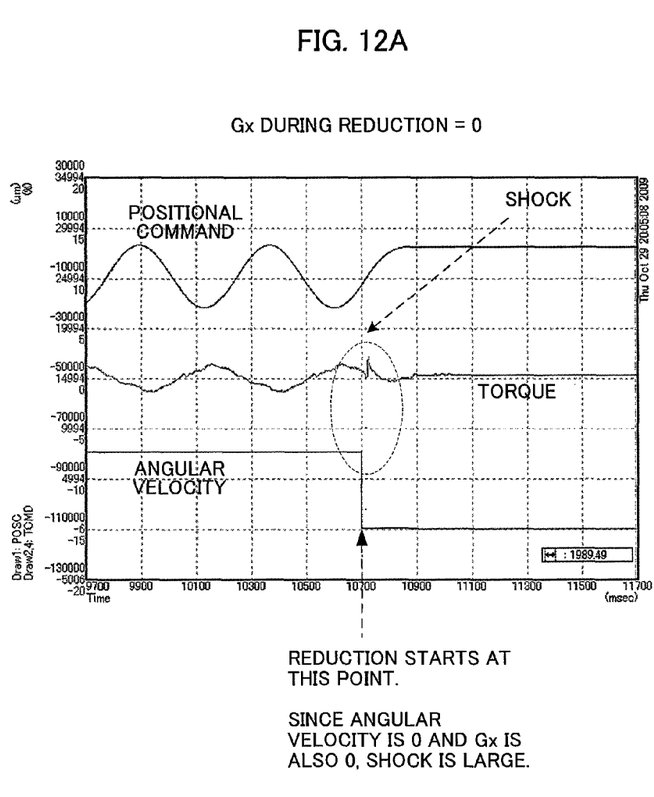
FIGS. 12A to 12B illustrate that a shock is reduced when the sine wave command ends.
Figure 12B:
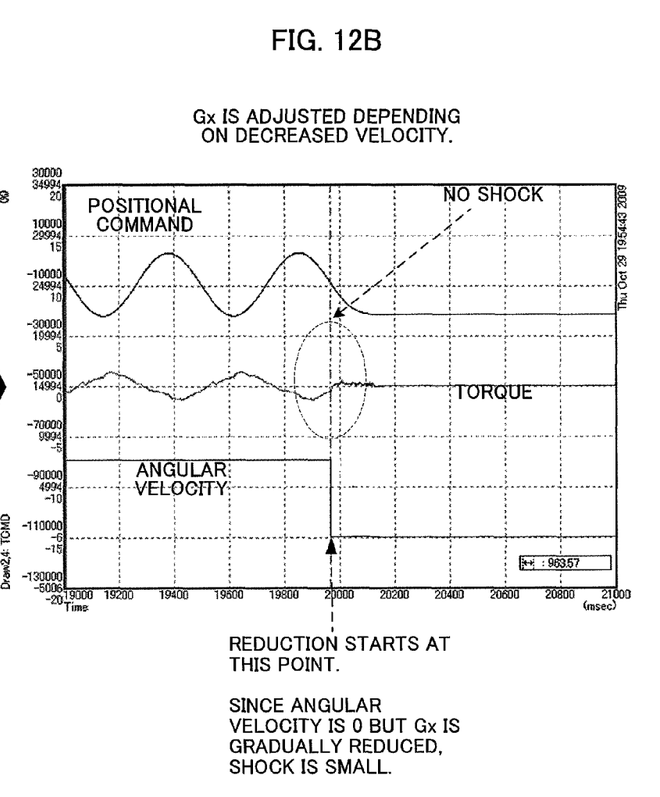

FIGS. 12A to 12B illustrate that a shock is reduced when the sine wave command ends. As shown in FIG. 12A, the angular velocity ω becomes 0 and the output Gx also becomes 0 when the velocity starts to be reduced, so a large shock occurs. In learning control in the angle synchronization method, the reference angle θ is referenced during learning, so if the reference angle θ remains unchanged, learning cannot be performed. Accordingly, if the output Gx from the phase advancing filter 47 abruptly becomes 0, a shock occurs. If Gx is adjusted depending on the reduced velocity, the angular velocity becomes 0 when the reduction starts, so the output Gx is gradually reduced and only a small shock occurs.

The invention claimed is:

1. A servomotor control system, having a control unit and a servo control unit, that controls a servomotor, provided in a machine tool or an industrial machine, that drives a driven body cyclically oscillating at high speed, wherein:
   the control unit includes
      a reference angle calculating means for calculating a reference angle ωt at time "t" (=nT, where n is 1, 2, 3, ...) from an angular velocity ω given according to the machining condition and the commanded distribution cycle T, and
      an oscillation command calculating means for calculating a cyclic oscillation command according to the reference angle and a machining condition;
   the servo control unit includes
      a position detecting means for detecting a position of the servomotor,
      a positional difference calculating means for calculating, for each commanded distribution cycle, a positional difference between a position in the oscillation command and the detected position of the servomotor, and
      a learning control means for performing learning control on the basis of the reference angle, the oscillation command, and the positional difference; and wherein
      the positional difference calculated by the positional difference calculating means is corrected by the learning control means, and the corrected positional difference is used to control driving of the servomotor.

2. The servomotor control system according to claim 1, wherein the learning control means includes
   first converting means for converting the positional difference obtained in the each commanded distribution cycle to a difference for each reference angle,
   correction calculating means for calculating an amount of correction with respect to the reference angle from the converted difference for each reference angle,
   correction storage means for storing the calculated amount of correction for at least one cycle of the driven body, which cyclically oscillates at high speed,
   second converting means for converting the amount of correction stored in the correction storage means to an amount of correction for each commanded distribution cycle, and
   a phase advancing filter for advancing a phase for the amount of correction obtained by the second converting means.

3. The servomotor control system according to claim 2, wherein the servo control unit further includes
   means for calculating, from the oscillation command and the position of the servomotor, an amount of overshoot at a start of an oscillation, and
   means for adjusting an output of the phase advancing filter according to the amount of overshoot.

4. The servomotor control system according to claim 2, wherein the servo control unit further includes
   means for calculating, from the oscillation command and the position of the servomotor, an amount of overshoot when an oscillation speed changes, and means for adjusting a size of the amount of correction stored in the correction storage means according to the amount of overshoot.

5. The servomotor control system according to claim 2, wherein the servo control unit further includes means for detecting that the positional difference falls within a prescribed range near 0 at the start of the oscillation, and wherein after the positional difference falls within the prescribed range near 0, the first converting means starts conversion of the positional difference obtained in the each commanded distribution cycle to the difference for each reference angle.

6. The servomotor control system according to claim 2, wherein the servo control unit further includes means for obtaining velocity data about the servomotor from the positional data about the servomotor at an end of the oscillation, and means for adjusting an output of the phase advancing filter by using the velocity data on the servomotor.

* * * * *